(12) United States Patent
Wang et al.

(10) Patent No.: US 12,387,304 B1
(45) Date of Patent: Aug. 12, 2025

(54) SMART IDENTIFICATION SYSTEM AND SMART IDENTIFICATION METHOD BY USING WIDE-ANGLE CAMERA

(71) Applicant: CHIMEI MOTOR ELECTRONICS CO., LTD., Tainan (TW)

(72) Inventors: Cheng-Chian Wang, Tainan (TW); Cheng-Ta Hsieh, Tainan (TW); Hsueh-Hsien Hsu, Tainan (TW)

(73) Assignee: CHIMEI MOTOR ELECTRONICS CO., LTD., Tainan (TW)

( * ) Notice: Subject to any disclaimer, the term of this patent is extended or adjusted under 35 U.S.C. 154(b) by 0 days.

(21) Appl. No.: 18/746,034

(22) Filed: Jun. 18, 2024

(51) Int. Cl.
  *G06K 9/00* (2022.01)
  *G06K 9/34* (2006.01)
  *G06K 9/46* (2006.01)
  *G06T 5/80* (2024.01)
  *G06V 10/24* (2022.01)

(52) U.S. Cl.
  CPC ...... *G06T 5/80* (2024.01); *G06T 2207/30252* (2013.01); *G06V 10/242* (2022.01); *G06V 10/245* (2022.01)

(58) Field of Classification Search
  CPC ............ G06T 5/80; G06T 2207/30252; G06V 10/242; G06V 10/245
  See application file for complete search history.

(56) References Cited

U.S. PATENT DOCUMENTS

| | | | | |
|---|---|---|---|---|
| 7,430,489 B2* | 9/2008 | Fager | ................... | G01S 5/0247 702/152 |
| 8,025,414 B2* | 9/2011 | Furui | ................... | H04N 9/3194 353/69 |
| 8,121,433 B2* | 2/2012 | Leprince | ................ | G01C 11/02 701/13 |
| 8,251,524 B2* | 8/2012 | Furui | ................... | H04N 9/3194 353/121 |
| 8,272,746 B2* | 9/2012 | Furui | ................... | H04N 9/3185 353/69 |
| 10,038,850 B2* | 7/2018 | Karttunen | .......... | H04N 23/6812 |
| 10,498,962 B2* | 12/2019 | Iso | ......... | H04N 25/76 |

(Continued)

FOREIGN PATENT DOCUMENTS

| | | | | |
|---|---|---|---|---|
| CN | 117876277 A | * | 4/2024 | ............... G06T 7/90 |
| GB | 2444566 | * | 12/2006 | |

*Primary Examiner* — Philip P. Dang

(74) *Attorney, Agent, or Firm* — CKC & Partners Co., LLC

(57) ABSTRACT

A smart identification system and a smart identification method by using a wide-angle camera are provided. The system includes a memory and a processor. The processor can load instructions stored in the memory to perform the smart identification method. The method includes: providing an image correction pattern; capturing an image of the image correction pattern by using a wide-angle camera to obtain a correction pattern image; and performing a picture rotation correction, a lens pitch angle correction, an inverse perspective projection and lens yaw angle correction on the wide-angle camera by using a matrix of lens rotation correction, a matrix of lens pitch angle correction, a matrix of lens yaw angle correction and inverse perspective projection, and a matrix of coordinates transformation, to straighten grid lines in the correction pattern image and transform coordinates in the correction pattern image captured by the wide-angle camera to world coordinates.

10 Claims, 9 Drawing Sheets

(56) References Cited

U.S. PATENT DOCUMENTS

| | | | |
|---|---|---|---|
| 10,529,091 B2* | 1/2020 | Kim | G06T 7/536 |
| 10,831,333 B2* | 11/2020 | Eisenmann | G06F 3/04815 |
| 10,841,602 B2* | 11/2020 | Wenger | H04N 19/44 |
| 11,074,495 B2* | 7/2021 | Zadeh | G06F 18/2413 |
| 11,195,057 B2* | 12/2021 | Zadeh | G06N 3/006 |
| 11,301,677 B2* | 4/2022 | Molin | G06V 40/18 |
| 11,465,642 B2* | 10/2022 | Xiao | B60W 60/001 |
| 11,866,067 B2* | 1/2024 | Choi | G06N 3/08 |
| 11,914,674 B2* | 2/2024 | Zadeh | G06N 3/044 |
| 11,962,794 B2* | 4/2024 | Wenger | H04N 19/44 |
| 12,067,475 B2* | 8/2024 | Yu | G06F 21/34 |
| 2009/0309878 A1* | 12/2009 | Otani | H04N 23/611 |
| | | | 345/427 |
| 2010/0149358 A1* | 6/2010 | Shioya | G06T 3/4038 |
| | | | 348/E5.024 |
| 2012/0114229 A1* | 5/2012 | Zhou | G01C 11/025 |
| | | | 382/164 |
| 2012/0250980 A1* | 10/2012 | Gillard | H04N 19/46 |
| | | | 382/173 |
| 2018/0204111 A1* | 7/2018 | Zadeh | G06V 10/764 |
| 2019/0355126 A1* | 11/2019 | Sun | G06T 3/16 |
| 2020/0082262 A1* | 3/2020 | Liu | G06N 3/04 |
| 2023/0037686 A1* | 2/2023 | Choi | G03B 21/147 |
| 2024/0290026 A1* | 8/2024 | Chen | A63F 13/57 |
| 2024/0428446 A1* | 12/2024 | Hatipoglu | G06T 7/70 |

\* cited by examiner distortion correction yaw angle correction pitch angle correction roll angle correction

SMART IDENTIFICATION SYSTEM AND SMART IDENTIFICATION METHOD BY USING WIDE-ANGLE CAMERA

BACKGROUND

Field of Invention

The present invention relates to a smart identification system and a smart identification method by using a wide-angle camera.

Description of Related Art

Driving safety is a very important issue for vehicle drivers and passengers. At present, the industry provides many technologies to enhance driving safety. For example, plural wide-angle cameras are installed on a vehicle to capture images from various directions of the vehicle. For another example, a car computer is provided to receive the images captured by the wide-angle cameras and determine whether the current driving situation of the vehicle is safe or not.

However, the images captured by the wide-angle camera are distortion images, which mean that the images captured by the wide-angle camera are distorted, such that it is difficult for the car computer to accurately judge the current road conditions. For example, it is difficult for the car computer to accurately calculate the distance between the driver's vehicle and surrounding objects (vehicles), which will affect the judgment of the car computer on the current road conditions.

Therefore, a smart identification system and a smart identification method using a wide-angle camera are needed to correct the distorted images captured by the wide-angle camera to facilitate image identification.

SUMMARY

Embodiments of the present invention propose a smart identification system and a smart identification method using a wide-angle camera, which can correct distorted images captured by the wide-angle camera.

According to some examples of the present invention, a smart identification method using a wide-angle camera includes: providing an image correction pattern; capturing an image of the image correction pattern by using a wide-angle camera to obtain a correction pattern image; and performing a correction step to performing a picture rotation correction, a lens pitch angle correction, an inverse perspective projection and yaw angle correction on the wide-angle camera by using a correction formula, so as to straighten grid lines in the correction pattern image and transform wide-angle image coordinates in the correction pattern image to world coordinates. The correction formula used in the correction step is:

$$\begin{bmatrix} X_w \\ Y_w \\ Z_w \\ 1 \end{bmatrix} = ABCD \begin{bmatrix} X_i \\ Y_i \\ 1 \\ 1 \end{bmatrix}$$

wherein $X_w$, $Y_w$, $Z_w$ represent three-dimensional coordinates of a world coordinate axis; $X_i$, $Y_i$ represent two-dimensional coordinates of a wide-angle image coordinate axis; and a matrix A is a lens rotation correction matrix, a matrix B is a lens pitch correction and inverse perspective projection matrix, a matrix C is a lens yaw angle correction, and a matrix D is a coordinate transformation matrix, which are expressed as follows:

$$\text{the matrix } A = \begin{bmatrix} \cos(\theta_{roll}) & -\sin(\theta_{roll}) & 0 & 0 \\ \sin(\theta_{roll}) & \cos(\theta_{roll}) & 0 & 0 \\ 0 & 0 & 1 & 0 \\ 0 & 0 & 0 & 1 \end{bmatrix}$$

$$\text{the matrix } B = \begin{bmatrix} 1 & 0 & 0 & 0 \\ 0 & \cos(\theta_{pitch}) & \sin(\theta_{pitch}) & -H \cdot \cos(\theta_{pitch}) \\ 0 & -\sin(\theta_{pitch}) & \cos(\theta_{pitch}) & H \cdot \sin(\theta_{pitch}) \\ 0 & 0 & 0 & 1 \end{bmatrix}^{-1}$$

$$\text{the matrix } C = \begin{bmatrix} \cos(\theta_{yaw}) & \sin(\theta_{yaw}) & 0 & 0 \\ -\sin(\theta_{yaw}) & \cos(\theta_{yaw}) & 0 & 0 \\ 0 & 0 & 1 & 0 \\ 0 & 0 & 0 & 1 \end{bmatrix}$$

$$\text{the matrix } D = \begin{bmatrix} \frac{1}{Z_c} K_x & 0 & \frac{1}{Z_c} \frac{w}{2} & 0 \\ 0 & -\frac{1}{Z_c} K_y & \frac{1}{Z_c} \frac{h}{2} & 0 \\ 0 & 0 & 1 & 0 \\ 0 & 0 & 0 & 1 \end{bmatrix}^{-1}$$

wherein $\theta_{yaw}$ is a lens yaw angle; $\theta_{pitch}$ is a lens pitch angle; $\theta_{roll}$ is a lens roll angle; H is a height of the wide-angle camera; $Z_c$ is a camera depth; $K_x$ is a proportional constant between an image pixel coordinate in an X-axis direction and the world coordinates; $K_y$ is a proportional constant between an image pixel coordinate in a Y-axis direction and the world coordinates; w is an image width (for example, in pixels); and h is an image height (for example, in pixels).

According to one embodiment, the wide-angle camera is a fisheye lens camera.

According to one embodiment, when the wide-angle camera is used to capture the image correction pattern, the wide-angle camera is mounted on a vehicle, and the image correction pattern is placed on a ground next to the vehicle.

According to one embodiment, the image correction pattern extends along the ground.

According to some embodiments of the present invention, a smart identification system by using a wide-angle camera includes a memory and a processor. The memory configured to store plural instructions. The processor is configured to load the instructions to perform steps of: providing an image correction pattern; capturing an image of the image correction pattern by using a wide-angle camera to obtain a correction pattern image; and performing a correction step to use a correction formula to perform a picture rotation correction, a lens pitch angle correction, an inverse perspective projection and lens yaw angle correction on the wide-angle camera to straighten plural grid lines in the correction pattern image and transform plural wide-angle image coordinates in the correction pattern image to plural world coordinates, wherein the correction formula used in the correction step is:

$$\begin{bmatrix} X_w \\ Y_w \\ Z_w \\ 1 \end{bmatrix} = ABCD \begin{bmatrix} X_i \\ Y_i \\ 1 \\ 1 \end{bmatrix}$$

wherein $X_w$, $Y_w$, $Z_w$ represent three-dimensional coordinates of a world coordinate axis; $X_i$, $Y_i$ represent two-dimensional coordinates of a wide-angle image coordinate axis; and a matrix A is a lens rotation correction matrix, a matrix B is a lens pitch correction and inverse perspective projection matrix, a matrix C is a lens yaw angle correction, and a matrix D is a coordinate transformation matrix, which are expressed as follows:

$$\text{the matrix } A = \begin{bmatrix} \cos(\theta_{roll}) & -\sin(\theta_{roll}) & 0 & 0 \\ \sin(\theta_{roll}) & \cos(\theta_{roll}) & 0 & 0 \\ 0 & 0 & 1 & 0 \\ 0 & 0 & 0 & 1 \end{bmatrix}$$

$$\text{the matrix } B = \begin{bmatrix} 1 & 0 & 0 & 0 \\ 0 & \cos(\theta_{pitch}) & \sin(\theta_{pitch}) & -H \cdot \cos(\theta_{pitch}) \\ 0 & -\sin(\theta_{pitch}) & \cos(\theta_{pitch}) & H \cdot \sin(\theta_{pitch}) \\ 0 & 0 & 0 & 1 \end{bmatrix}^{-1}$$

$$\text{the matrix } C = \begin{bmatrix} \cos(\theta_{yaw}) & \sin(\theta_{yaw}) & 0 & 0 \\ -\sin(\theta_{yaw}) & \cos(\theta_{yaw}) & 0 & 0 \\ 0 & 0 & 1 & 0 \\ 0 & 0 & 0 & 1 \end{bmatrix}$$

$$\text{the matrix } D = \begin{bmatrix} \frac{1}{Z_c}K_x & 0 & \frac{1}{Z_c}\frac{w}{2} & 0 \\ 0 & -\frac{1}{Z_c}K_y & \frac{1}{Z_c}\frac{h}{2} & 0 \\ 0 & 0 & 1 & 0 \\ 0 & 0 & 0 & 1 \end{bmatrix}^{-1}$$

wherein $\theta_{yaw}$ is a lens yaw angle; $\theta_{pitch}$ is a lens pitch angle; $\theta_{roll}$ is a lens roll angle; H is a height of the wide-angle camera; $Z_c$ is a camera depth; $K_x$ is a proportional constant between an image pixel coordinate in an X-axis direction and the world coordinates; $K_y$ is a proportional constant between an image pixel coordinate in a Y-axis direction and the world coordinates; w is an image width (for example, in pixels); and h is an image height (for example, in pixels).

In some embodiments, the wide-angle camera is a fisheye lens camera.

In some embodiments, the image correction pattern comprises a black and white checkerboard pattern.

In some embodiments, when the wide-angle camera is used to capture the image correction pattern, the wide-angle camera is mounted on a vehicle, and the image correction pattern is placed on a ground next to the vehicle.

In some embodiments, the image correction pattern extends along the ground.

DETAILED DESCRIPTION

Figure 1:
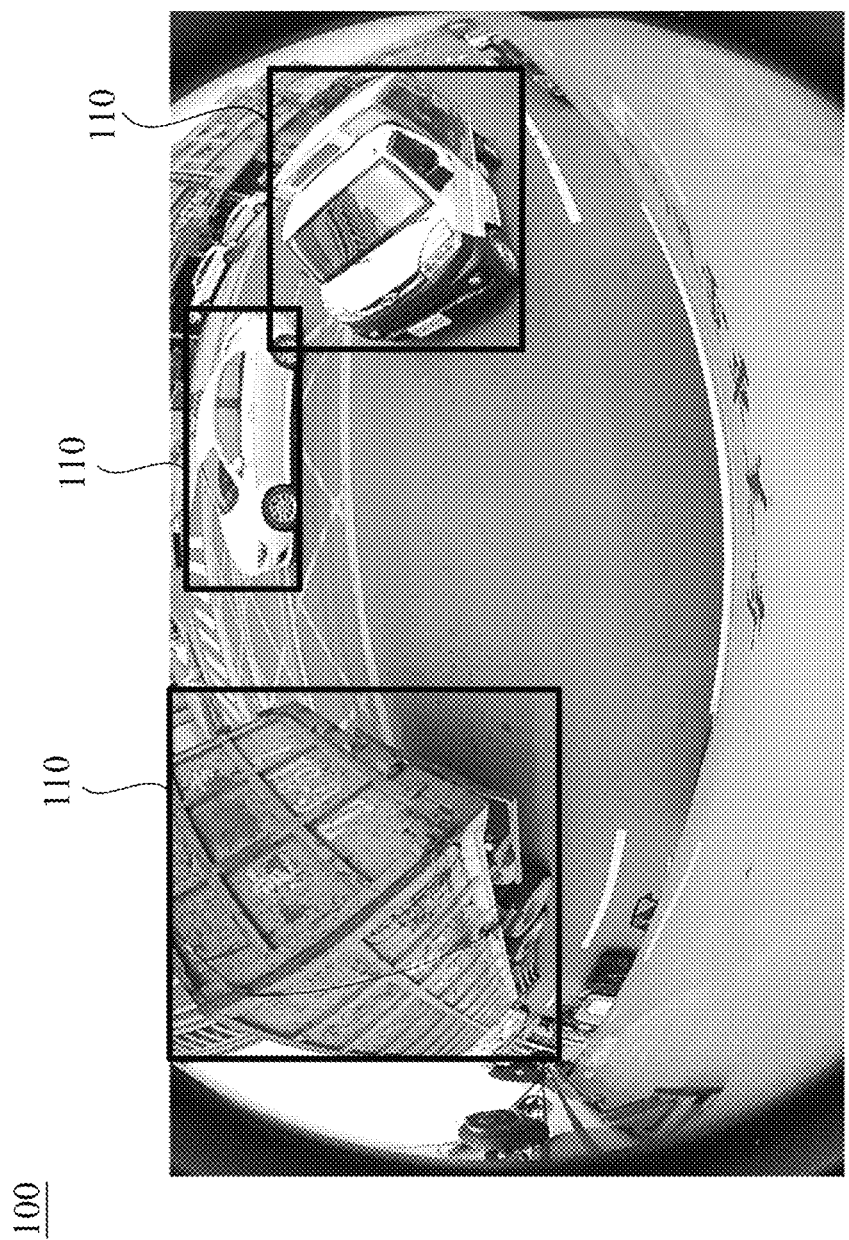
FIG. 1 is a schematic diagram showing an image captured by a wide-angle camera.

Referring to FIG. 1, FIG. 1 is a schematic diagram showing an image 100 captured by a wide-angle camera. The wide-angle camera is mounted on a vehicle of a driver to shoot the road conditions around the vehicle of the driver and transmits the captured image 100 to a car computer for the car computer to determine whether the vehicle of the driver is too close to other vehicles/objects. Specifically, the car computer will detect objects 110 in the image 100 and determine whether the objects 110 are too close to the vehicle of the driver to further decide whether to issue a warning. However, the image 100 captured by the wide-angle camera is distorted, such that it is difficult for the car computer to accurately calculate the distances between the vehicle of the driver and the surrounding objects 110 and accurately issue a warning.

Figure 2:
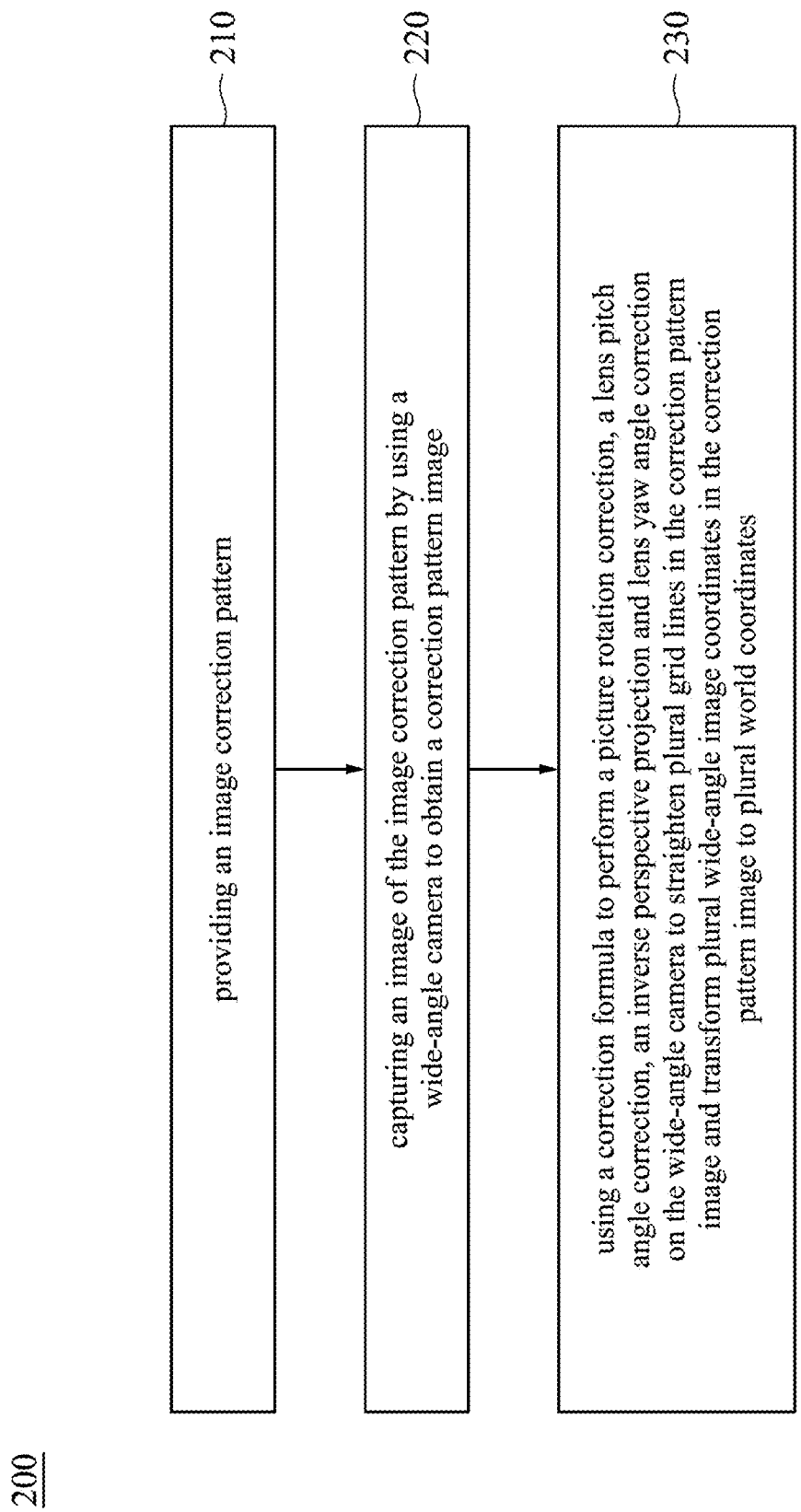
FIG. 2 is a schematic flowchart illustrating a smart identification method by using a wide-angle camera in accordance with one embodiment of the present invention.
Figure 3:
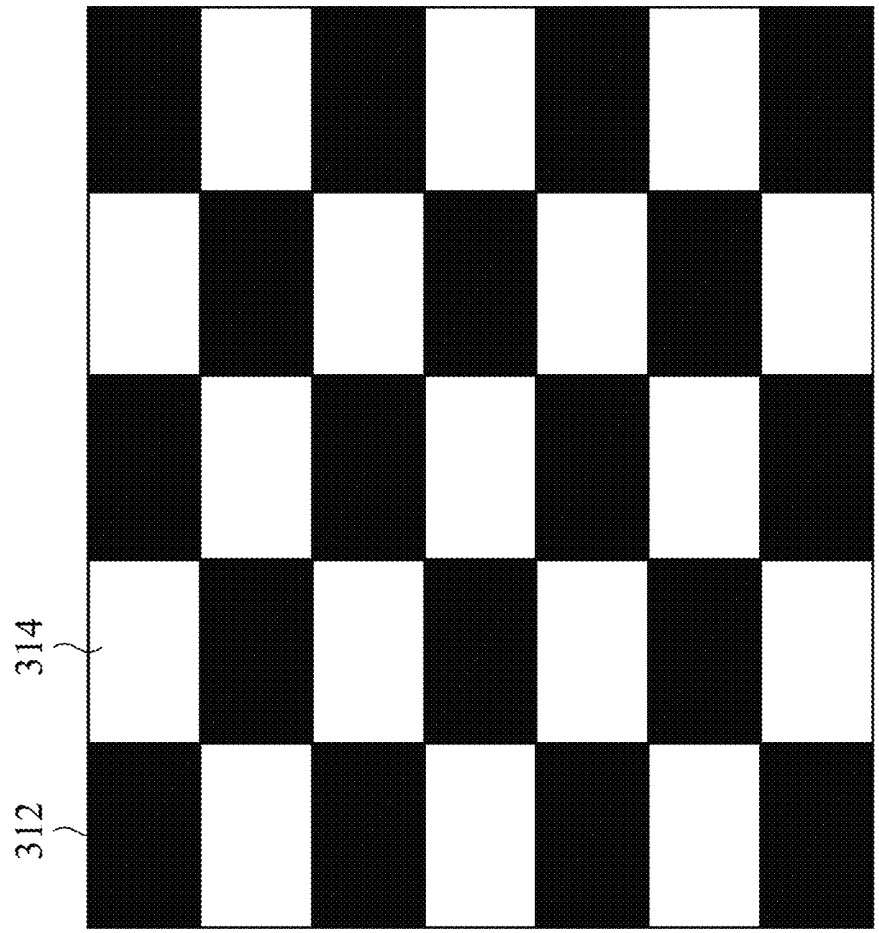
FIG. 3 illustrates an image correction pattern in accordance with one embodiment of the present invention.

Referring to FIG. 2, FIG. 2 is a schematic flowchart illustrating a smart identification method 200 by using a wide-angle camera in accordance with one embodiment of the present invention. The smart identification method 200 by using a wide-angle camera is used to correct the image data of the image 100 captured by the wide-angle camera. For example, the coordinate data in the image 100 is corrected, such that it can accurately correspond to the camera coordinates, and thus the car computer can accurately calculate the distances between the vehicle of the driver and surrounding objects. In the smart identification method 200 by using a wide-angle camera, a step 210 is first performed to provide an image correction pattern 300, as shown in FIG. 3. In the present embodiment, the image correction pattern 300 includes a black and white checkerboard pattern. Specifically, black grids 312 and white grids 314 are alternately arranged in a matrix to form the image correction pattern 300, but the embodiments of the present invention are not limited thereto. In some embodiments, the image correction pattern 300 is formed on a correction plate, but embodiments of the present invention are not limited thereto.

Figure 4:
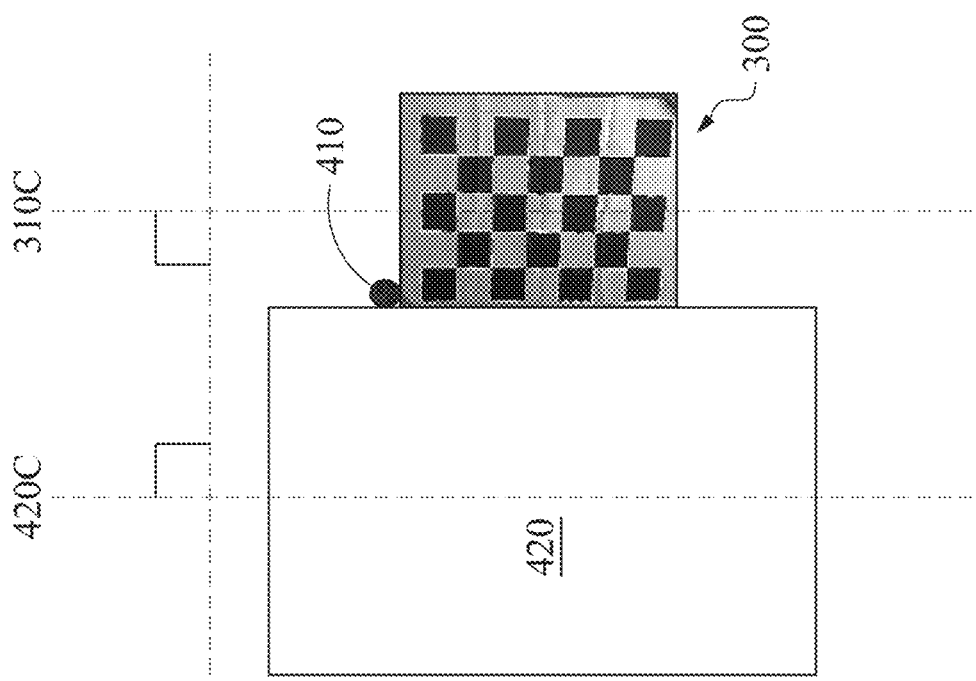
FIG. 4 illustrates a shooting method of an image correction pattern in accordance with one embodiment of the present invention.

Returning to FIG. 2, after the step 210, a step 220 is performed to capture an image of the image correction pattern 300 on the correction plate by using a wide-angle camera 410, as shown in FIG. 4. In the present embodiment, the wide-angle camera 410 is mounted on a side of a vehicle 420, such as a side view mirror. The wide-angle camera 410 may be, for example, a fisheye lens, but the embodiments of the present invention are not limited thereto. The correction plate is placed on the ground at a side of the vehicle 420, such that the image correction pattern 300 is aligned with the vehicle 420 and extends along the ground. In the present embodiment, a center line 310C of the image correction pattern 300 and a center line 420C of the vehicle 420 are parallel to each other, such that the wide-angle camera 410 can accurately capture the image correction pattern 300.

In some embodiments, the wide-angle camera 410 is disposed behind the vehicle 420, and the correction plate is placed on the ground behind the vehicle 420, such that the image correction pattern 300 is aligned with the vehicle 420 and extends along the ground to facilitate the wide-angle camera 410 to accurately capture the image correction pattern 300.

Returning to FIG. 2, after the step 220, a step 230 is performed to correct the correction pattern image captured in the step 220. In the correction step, a correction formula is used to calculate intrinsic parameters and extrinsic parameters of the wide-angle camera 410 to obtain a corresponding coordinate transformation matrix. Specifically, the correction step of the step 230 uses the correction formula to perform a picture rotation correction, a lens pitch angle correction, an inverse perspective projection and lens yaw angle correction on the wide-angle camera 410 to straighten plural grid lines in the correction pattern image and transform wide-angle image coordinates in the correction pattern image to world coordinates. The world coordinates are based on the camera as the origin, such that the distances between the vehicle of the driver and the surrounding objects can be calculated. The correction formula used in the present embodiment is as follows:

$$\begin{bmatrix} X_w \\ Y_w \\ Z_w \\ 1 \end{bmatrix} = ABCD \begin{bmatrix} X_i \\ Y_i \\ 1 \\ 1 \end{bmatrix} \quad (1)$$

wherein $X_w, Y_w, Z_w$ represent three-dimensional coordinates of a world coordinate axis; $X_i, Y_i$ represent two-dimensional coordinates of a wide-angle image coordinate axis; and a matrix A is a lens rotation correction matrix, a matrix B is a lens pitch correction and inverse perspective projection matrix, a matrix C is a lens yaw angle correction, and a matrix D is a coordinate transformation matrix, which are expressed as follows:

$$\text{the matrix } A = \begin{bmatrix} \cos(\theta_{roll}) & -\sin(\theta_{roll}) & 0 & 0 \\ \sin(\theta_{roll}) & \cos(\theta_{roll}) & 0 & 0 \\ 0 & 0 & 1 & 0 \\ 0 & 0 & 0 & 1 \end{bmatrix} \quad (2)$$

$$\text{the matrix } B = \begin{bmatrix} 1 & 0 & 0 & 0 \\ 0 & \cos(\theta_{pitch}) & \sin(\theta_{pitch}) & -H \cdot \cos(\theta_{pitch}) \\ 0 & -\sin(\theta_{pitch}) & \cos(\theta_{pitch}) & H \cdot \sin(\theta_{pitch}) \\ 0 & 0 & 0 & 1 \end{bmatrix}^{-1} \quad (3)$$

$$\text{the matrix } C = \begin{bmatrix} \cos(\theta_{yaw}) & \sin(\theta_{yaw}) & 0 & 0 \\ -\sin(\theta_{yaw}) & \cos(\theta_{yaw}) & 0 & 0 \\ 0 & 0 & 1 & 0 \\ 0 & 0 & 0 & 1 \end{bmatrix} \quad (4)$$

$$\text{the matrix } D = \begin{bmatrix} \frac{1}{Z_c} K_x & 0 & \frac{1}{Z_c} \frac{w}{2} & 0 \\ 0 & -\frac{1}{Z_c} K_y & \frac{1}{Z_c} \frac{h}{2} & 0 \\ 0 & 0 & 1 & 0 \\ 0 & 0 & 0 & 1 \end{bmatrix}^{-1} \quad (5)$$

In the matrixes A to D, $\theta_{yaw}$ is a lens yaw angle; pitch is a lens pitch angle; $\theta_{roll}$ is a lens roll angle; H is a height of the wide-angle camera; $Z_c$ is a camera depth; $K_x$ is a proportional constant between an image pixel coordinate in an X-axis direction and the world coordinates; $K_y$ is a proportional constant between an image pixel coordinate in a Y-axis direction and the world coordinates; w is an image width (for example, in pixels); and h is an image height (for example, in pixels).

Figure 5:
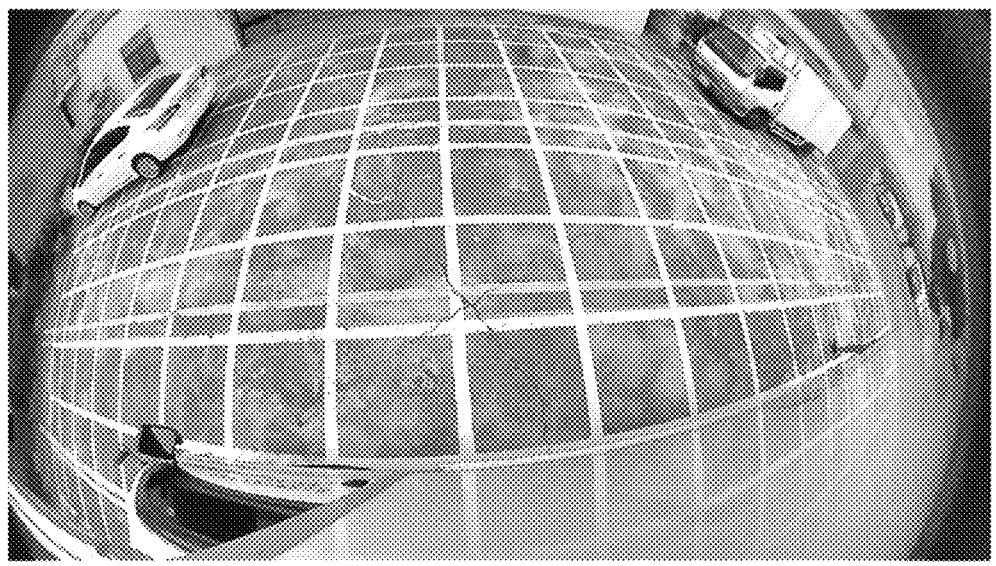
FIG. 5 illustrates straightening of a wide-angle image in accordance with one embodiment of the present invention.
Figure 5:
Figure 5:
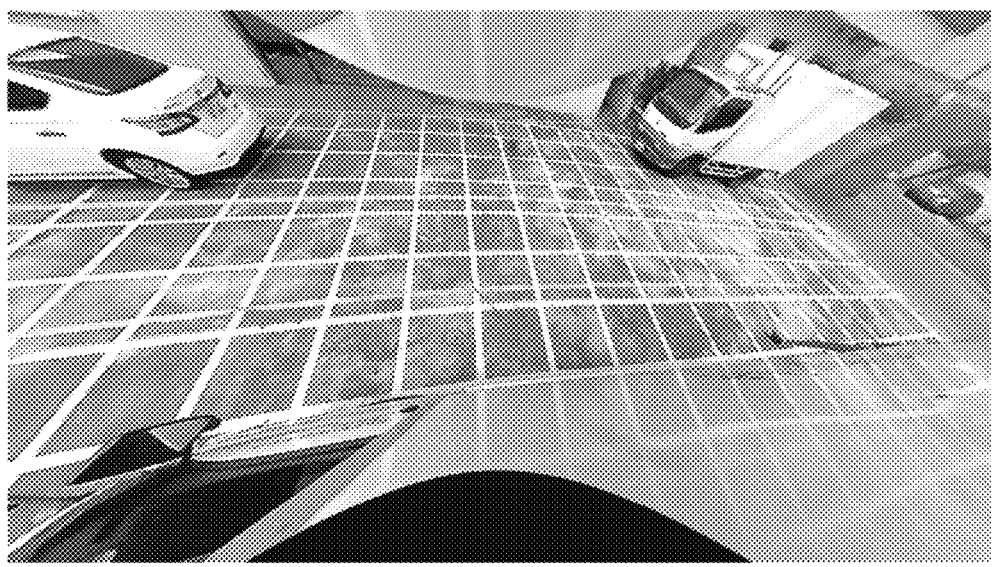
Figure 6:
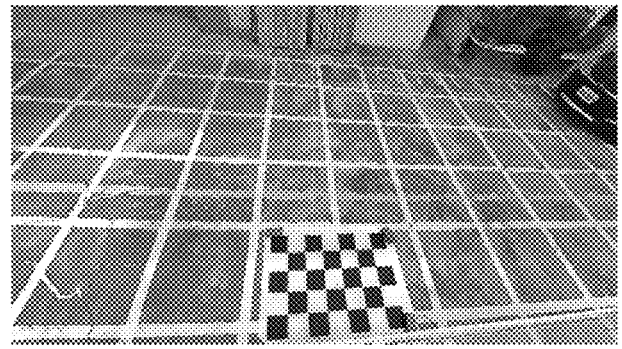
FIG. 6 illustrates grid width restoration of a wide-angle image in accordance with one embodiment of the present invention.
Figure 6:
Figure 6:
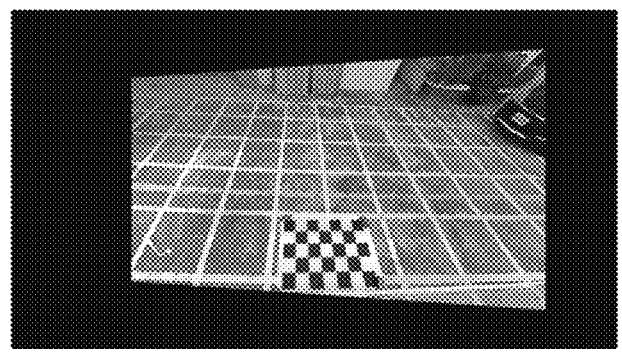
Figure 7:
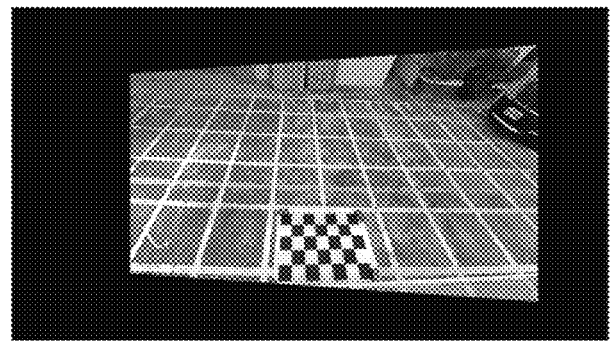
FIG. 7 illustrates grid length restoration of a wide-angle image in accordance with one embodiment of the present invention.
Figure 7:
Figure 7:
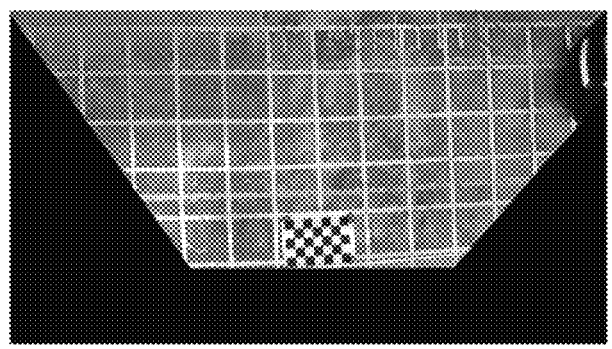
Figure 8:
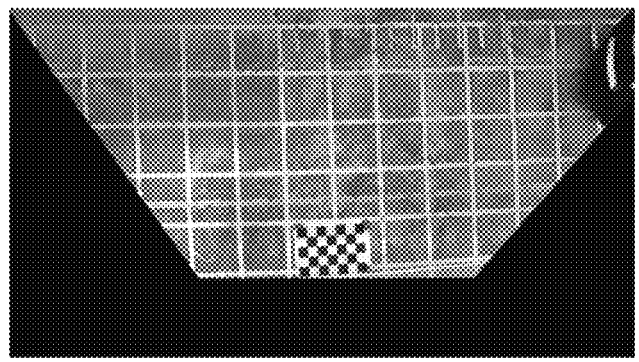
FIG. 8 illustrates roll angle rotation of a wide-angle image in accordance with one embodiment of the present invention.
Figure 8:
Figure 8:
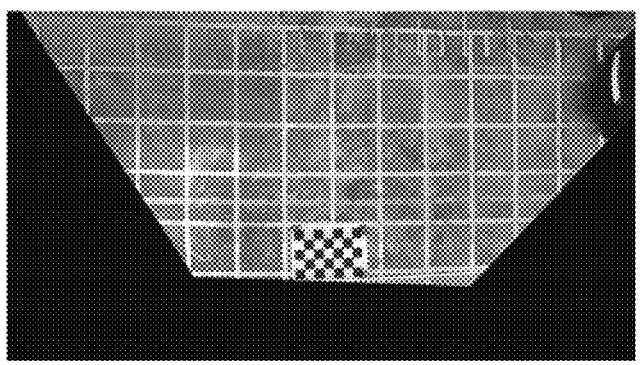

The design of the matrix A, matrix B, matrix C, and matrix D (hereinafter collectively referred to as the conversion matrix) takes the intrinsic parameters (camera distortion correction) and the extrinsic parameters (pitch/yaw/roll angle calculation) into account to correct the distorted wide-angle image. For example, as shown in FIG. 5, the distorted wide-angle image can be corrected and straightened after being processed in the step 230 of the present embodiment. Specifically, the wide-angle image in FIG. 5 has grid lines, and the grid lines represent the distortion of the wide-angle image. After being processed in the step 230 of the present embodiment, the grid lines are straightened. For another example, as shown in FIG. 6, the visually distorted grid line width can be restored through the yaw angle correction in the step 230 of the present embodiment. For still another example, as shown in FIG. 7, the visually distorted grid line length can be restored through the pitch angle correction in the step 230 of the present embodiment. For yet another example, as shown in FIG. 8, the step 230 of the present embodiment performs roll angle rotation on the entire picture.

By substituting the coordinate values (world coordinates/wide-angle image coordinates) of the known positions on the correction plate into the above correction formula, the transformation matrix can be obtained, and then the relationship between $X_w, Y_w, Z_w$ (the three-dimensional coordinates of the world coordinate axis) and $X_i, Y_i$ (the two-dimensional coordinates of the wide-angle image coordinate axis) can be obtained. When the user uses the wide-angle camera 410 to take pictures, the car computer can use the above transformation matrix to correct the wide-angle image captured by the wide-angle camera 410 and to calculate the distances between the vehicle of the driver and the surrounding objects.

For example, in some embodiments, after the wide-angle camera 410 is corrected by the smart identification method 200 by using a wide-angle camera, the transformation matrix of the wide-angle camera 410 can be obtained. After the transformation matrix is written into the car computer, in the subsequent driving stage of the vehicle, the car computer can use the stored transformation matrix to correct the wide-angle image captured by the wide-angle camera 410 and calculate the distances between the vehicle of the driver and the surrounding objects.

Figure 9:
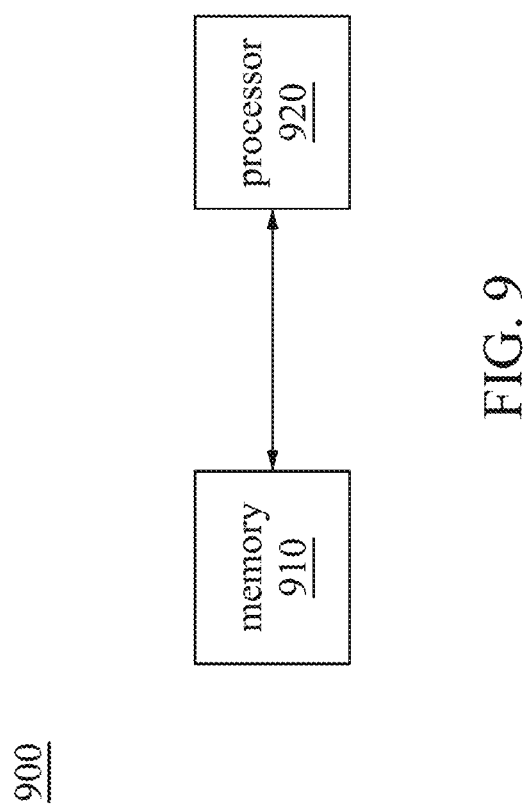
FIG. 9 illustrates a smart identification system by using a wide-angle camera in accordance with one embodiment of the present invention.

Referring to FIG. 9, FIG. 9 illustrates a smart identification system 900 by using a wide-angle camera in accordance with one embodiment of the present invention. The smart identification system 900 by using a wide-angle camera includes a memory 910 and a processor 920. The memory 910 stores plural instructions, and the processor 920 is electrically connected to the memory 910 to load the instructions to perform the above smart identification method 200 by using a wide-angle camera. In some embodiments, the smart identification system 900 by using a wide-angle camera can be implemented as a computer device, which can receive the wide-angle image captured by the wide-angle camera 410 and apply the smart identification method 200 by using a wide-angle camera to correct the wide-angle image captured by the wide-angle camera 410 to obtain the above transformation matrix.

According to the aforementioned description, the smart identification method 200 by using a wide-angle camera and the smart identification system 900 by using a wide-angle camera of the embodiment of the present invention use a lens rotation correction matrix (matrix A), a lens pitch correction and inverse perspective projection matrix (matrix B), a lens yaw correction matrix (matrix C), and a coordinate transformation matrix (matrix D) to correct the image of the wide-angle camera, so as to eliminate image distortion, and calculate the distance between each object in the image and the coordinate origin (camera). Applying such a method can enhance the accuracy of the car computer in determining the distances between the vehicle of the driver and the surrounding objects, and facilitate the car computer to identify each object in the image, thereby greatly enhancing the driver's driving safety.

Although the present invention has been disclosed above with embodiments, it is not intended to limit the present disclosure. Any person having ordinary skill in the art can make various changes and modifications without departing from the spirit and scope of the present invention. Therefore, the protection scope of the present invention should be defined by the scope of the appended claims.

What is claimed is:

1. A smart identification method by using a wide-angle camera, suitable for a wide-angle camera image correction system, wherein the smart identification method by using the wide-angle camera comprises:
   providing an image correction pattern;
   capturing an image of the image correction pattern by using the wide-angle camera to obtain a correction pattern image; and
   performing a correction step to use a correction formula to perform a picture rotation correction, a lens pitch angle correction, an inverse perspective projection and lens yaw angle correction on the wide-angle camera to straighten a plurality of grid lines in the correction pattern image and transform a plurality of wide-angle image coordinates in the correction pattern image to a plurality of world coordinates, wherein the correction formula used in the correction step is:

$$\begin{bmatrix} X_w \\ Y_w \\ Z_w \\ 1 \end{bmatrix} = ABCD \begin{bmatrix} X_i \\ Y_i \\ 1 \\ 1 \end{bmatrix}$$

wherein $X_w$, $Y_w$, $Z_w$ represent three-dimensional coordinates of a world coordinate axis; $X_i$, $Y_i$ represent two-dimensional coordinates of a wide-angle image coordinate axis; and a matrix A is a lens rotation correction matrix, a matrix B is a lens pitch correction and inverse perspective projection matrix, a matrix C is a lens yaw angle correction, and a matrix D is a coordinate transformation matrix, which are expressed as follows:

$$\text{the matrix } A = \begin{bmatrix} \cos(\theta_{roll}) & -\sin(\theta_{roll}) & 0 & 0 \\ \sin(\theta_{roll}) & \cos(\theta_{roll}) & 0 & 0 \\ 0 & 0 & 1 & 0 \\ 0 & 0 & 0 & 1 \end{bmatrix}$$

$$\text{the matrix } B = \begin{bmatrix} 1 & 0 & 0 & 0 \\ 0 & \cos(\theta_{pitch}) & \sin(\theta_{pitch}) & -H \cdot \cos(\theta_{pitch}) \\ 0 & -\sin(\theta_{pitch}) & \cos(\theta_{pitch}) & H \cdot \sin(\theta_{pitch}) \\ 0 & 0 & 0 & 1 \end{bmatrix}^{-1}$$

$$\text{the matrix } C = \begin{bmatrix} \cos(\theta_{yaw}) & \sin(\theta_{yaw}) & 0 & 0 \\ -\sin(\theta_{yaw}) & \cos(\theta_{yaw}) & 0 & 0 \\ 0 & 0 & 1 & 0 \\ 0 & 0 & 0 & 1 \end{bmatrix}$$

$$\text{the matrix } D = \begin{bmatrix} \frac{1}{Z_c} K_x & 0 & \frac{1}{Z_c} \frac{w}{2} & 0 \\ 0 & -\frac{1}{Z_c} K_y & \frac{1}{Z_c} \frac{h}{2} & 0 \\ 0 & 0 & 1 & 0 \\ 0 & 0 & 0 & 1 \end{bmatrix}^{-1}$$

wherein $\theta_{yaw}$ is a lens yaw angle; $\theta_{pitch}$ is a lens pitch angle; $\theta_{roll}$ is a lens roll angle; H is a height of the wide-angle camera; $Z_c$ is a camera depth; $K_x$ is a proportional constant between an image pixel coordinate in an X-axis direction and the world coordinates; $K_y$ is a proportional constant between an image pixel coordinate in a Y-axis direction and the world coordinates; w is an image width; and h is an image height.

2. The smart identification method by using the wide-angle camera of claim 1, wherein the wide-angle camera is a fisheye lens camera.

3. The smart identification method by using the wide-angle camera of claim 1, wherein the image correction pattern comprises a black and white checkerboard pattern.

4. The smart identification method by using the wide-angle camera of claim 1, wherein when the wide-angle camera is used to capture the image correction pattern, the wide-angle camera is mounted on a vehicle, and the image correction pattern is placed on a ground next to the vehicle.

5. The smart identification method by using the wide-angle camera of claim 4, wherein the image correction pattern extends along the ground.

6. A smart identification system by using a wide-angle camera, comprising:
   a memory configured to store a plurality of instructions; and
   a processor electrically connected to the memory and configured to load the instructions to perform steps of:
      providing an image correction pattern;
      capturing an image of the image correction pattern by using the wide-angle camera to obtain a correction pattern image; and
      performing a correction step to use a correction formula to perform a picture rotation correction, a lens pitch angle correction, an inverse perspective projection and lens yaw angle correction on the wide-angle camera to straighten a plurality of grid lines in the correction pattern image and transform a plurality of wide-angle image coordinates in the correction pattern image to a plurality of world coordinates, wherein the correction formula used in the correction step is:

$$\begin{bmatrix} X_w \\ Y_w \\ Z_w \\ 1 \end{bmatrix} = ABCD \begin{bmatrix} X_i \\ Y_i \\ 1 \\ 1 \end{bmatrix}$$

wherein $X_w$, $Y_w$, $Z_w$ represent three-dimensional coordinates of a world coordinate axis; $X_i$, $Y_i$ represent two-dimensional coordinates of a wide-angle image coordinate axis; and a matrix A is a lens rotation correction matrix, a matrix B is a lens pitch correction and inverse perspective projection matrix, a matrix C is a lens yaw angle correction, and a matrix D is a coordinate transformation matrix, which are expressed as follows:

the matrix $A = \begin{bmatrix} \cos(\theta_{roll}) & -\sin(\theta_{roll}) & 0 & 0 \\ \sin(\theta_{roll}) & \cos(\theta_{roll}) & 0 & 0 \\ 0 & 0 & 1 & 0 \\ 0 & 0 & 0 & 1 \end{bmatrix}$ the matrix $B = \begin{bmatrix} 1 & 0 & 0 & 0 \\ 0 & \cos(\theta_{pitch}) & \sin(\theta_{pitch}) & -H \cdot \cos(\theta_{pitch}) \\ 0 & -\sin(\theta_{pitch}) & \cos(\theta_{pitch}) & H \cdot \sin(\theta_{pitch}) \\ 0 & 0 & 0 & 1 \end{bmatrix}^{-1}$ the matrix $C = \begin{bmatrix} \cos(\theta_{yaw}) & \sin(\theta_{yaw}) & 0 & 0 \\ -\sin(\theta_{yaw}) & \cos(\theta_{yaw}) & 0 & 0 \\ 0 & 0 & 1 & 0 \\ 0 & 0 & 0 & 1 \end{bmatrix}$ the matrix $D = \begin{bmatrix} \frac{1}{Z_c}K_x & 0 & \frac{1}{Z_c}\frac{w}{2} & 0 \\ 0 & -\frac{1}{Z_c}K_y & \frac{1}{Z_c}\frac{h}{2} & 0 \\ 0 & 0 & 1 & 0 \\ 0 & 0 & 0 & 1 \end{bmatrix}^{-1}$ wherein $\theta_{yaw}$ is a lens yaw angle; $\theta_{pitch}$ is a lens pitch angle; $\theta_{roll}$ is a lens roll angle; H is a height of the wide-angle camera; $Z_c$ is a camera depth; $K_x$ is a proportional constant between an image pixel coordinate in an X-axis direction and the world coordinates; $K_y$ is a proportional constant between an image pixel coordinate in a Y-axis direction and the world coordinates; w is an image width; and h is an image height.

7. The smart identification system by using the wide-angle camera of claim 6, wherein the wide-angle camera is a fisheye lens camera.

8. The smart identification system by using the wide-angle camera of claim 6, wherein the image correction pattern comprises a black and white checkerboard pattern.

9. The smart identification system by using the wide-angle camera of claim 6, wherein when the wide-angle camera is used to capture the image correction pattern, the wide-angle camera is mounted on a vehicle, and the image correction pattern is placed on a ground next to the vehicle.

10. The smart identification system by using the wide-angle camera of claim 9, wherein the image correction pattern extends along the ground.

* * * * *